(12) United States Patent
Sullivan et al.

(10) Patent No.: US 10,995,735 B1
(45) Date of Patent: May 4, 2021

(54) UNIVERSAL ROOT END SUPPORT FIXTURE FOR WIND TURBINE BLADE

(71) Applicants: Andrew J. Sullivan, Bedford, TX (US); James H. Jones, III, Arlington, TX (US); Billy R. Goodwin, Richland Hills, TX (US)

(72) Inventors: Andrew J. Sullivan, Bedford, TX (US); James H. Jones, III, Arlington, TX (US); Billy R. Goodwin, Richland Hills, TX (US)

(73) Assignee: BNSF Logistics, LLC, Springdale, AR (US)

(*) Notice: Subject to any disclaimer, the term of this patent is extended or adjusted under 35 U.S.C. 154(b) by 0 days.

(21) Appl. No.: 16/669,729

(22) Filed: Oct. 31, 2019

(51) Int. Cl.
*F03D 13/40* (2016.01)

(52) U.S. Cl.
CPC .......... *F03D 13/40* (2016.05); *F05B 2260/02* (2013.01)

(58) Field of Classification Search
CPC .......... F03D 13/40; F03D 1/005; F03D 80/00; F03D 1/0633
USPC .... 410/2, 3, 77, 44, 7, 80, 69, 156, 121, 97, 410/9, 89, 86; 248/201, 274.1, 647, 248/176.1, 176.3
See application file for complete search history.

(56) References Cited

U.S. PATENT DOCUMENTS

| | | | |
|---|---|---|---|
| 4,929,132 A * | 5/1990 | Yeates | B61D 3/10 410/45 |
| 7,303,365 B2 | 12/2007 | Wobben | |
| 7,591,621 B1 | 9/2009 | Landrum et al. | |
| 7,670,090 B1 | 3/2010 | Landrum et al. | |
| 7,690,875 B2 * | 4/2010 | Grabau | B60P 3/40 410/45 |
| 7,744,318 B2 | 6/2010 | Wobben | |
| 8,382,407 B1 * | 2/2013 | Landrum | B60P 3/40 410/45 |
| 8,708,625 B1 | 4/2014 | Landrum et al. | |
| 8,834,082 B1 | 9/2014 | Landrum et al. | |
| 8,961,085 B2 | 2/2015 | Ressel et al. | |
| 8,985,920 B2 | 3/2015 | Bitsch et al. | |
| 9,011,054 B2 | 4/2015 | Thomsen | |
| 9,315,200 B1 | 4/2016 | Landrum et al. | |
| 9,347,426 B2 | 5/2016 | Landrum et al. | |
| 9,494,140 B2 | 11/2016 | Sigurdsson | |
| 9,567,969 B2 | 2/2017 | Sigurdsson | |
| 9,738,458 B2 | 8/2017 | Schmidt et al. | |
| 9,790,927 B1 | 10/2017 | Landrum et al. | |
| 10,030,633 B2 | 7/2018 | Sigurdsson | |
| 2005/0031431 A1 | 2/2005 | Wobben | |
| 2011/0142589 A1 * | 6/2011 | ten Thoren | B60P 3/40 414/800 |

(Continued)

*Primary Examiner* — D Glenn Dayoan
*Assistant Examiner* — Sunsurraye Westbrook
(74) *Attorney, Agent, or Firm* — Dan Brown Law Office; Daniel R. Brown

(57) ABSTRACT

A support fixture for a wind turbine blades transported by rail. A main frame pivots about a first vertical axis and a first lateral axis, and has a frame arm extending from it. The main frame supports the wind turbine blade on a blade cradle. A root end stand is pivotally supported from the frame arm about a second vertical axis. A mounting flange adapter, coupled to the wind turbine blade, pivots about a second lateral axis and a longitudinal axis, and is supported by the root end stand. Fixture has universal adaptability by virtue of the plural axes of pivot.

18 Claims, 14 Drawing Sheets

(56) References Cited

U.S. PATENT DOCUMENTS

| | | |
|---|---|---|
| 2013/0315685 A1 | 11/2013 | Pedersen et al. |
| 2014/0050547 A1* | 2/2014 | Hiremath ................. B60P 3/40 |
| | | 410/44 |
| 2014/0064870 A1 | 3/2014 | Thomsen |

* cited by examiner

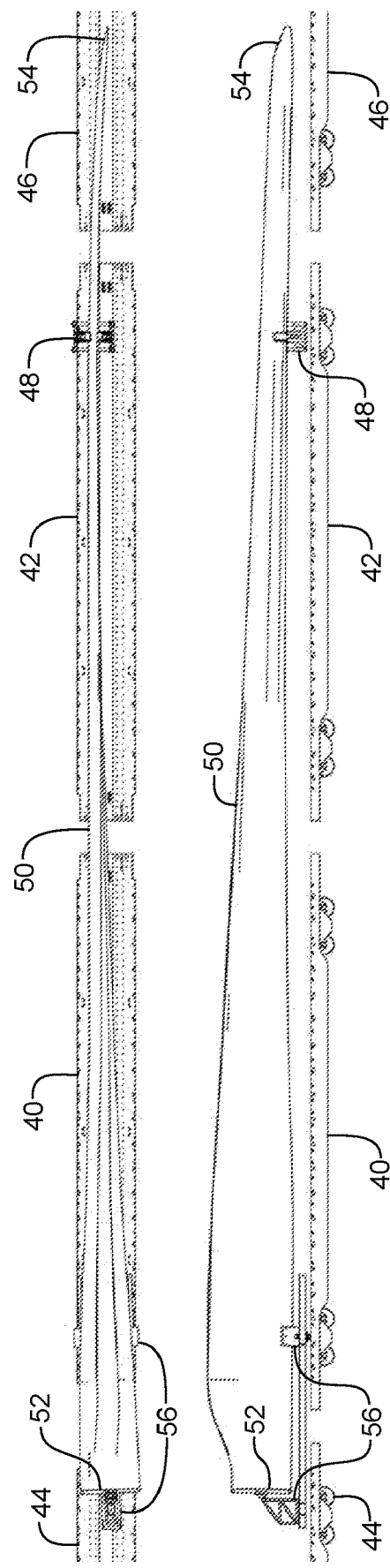

UNIVERSAL ROOT END SUPPORT FIXTURE FOR WIND TURBINE BLADE

BACKGROUND OF THE INVENTION

Related Applications

None.

Field of the Invention

The present invention relates to support fixtures for the transportation of wind turbine blades. More particularly, the present invention relates to universally adaptable wind turbine blade blade root end support fixtures having multiple axes of pivotal rotation and compatibility with intermodal transport fixture systems.

DESCRIPTION OF THE RELATED ART

The continued growth of wind power utilization has led to increasingly larger wind turbine structures. This has presented a number of challenges in the field of logistics for transporting wind turbine components from the points of manufacturer to the points of utilization. Since the distances involved are of a global scale, various modes of transportation are routinely employed, including ocean vessels, barges, railroads and trucks. In the particular case of wind turbine blades, which are very long and relatively fragile, various support fixtures have been developed to facilitate efficient and economical transportation, including inter-modal systems of transportation.

The assignee of the present disclosure holds a range of US patents that are germane to the logistics of wind turbine blade transportation. These patents are listed below, and the entire contents and teachings of all of these patents are hereby incorporated by reference, and in their entirety, for all purposes.
- A) U.S. Pat. No. 7,591,621 issued on Sep. 22, 2009 to Landrum et al. for Wind Turbine Blade Transportation System and Method.
- B) U.S. Pat. No. 7,670,090 issued on Mar. 2, 2010 to Landrum et al. for Wind Turbine Blade Transportation System and Method.
- C) U.S. Pat. No. 8,708,625 issued on Apr. 29, 2014 to Landrum et al. for Wind Turbine Blade Railroad Transportation System and Method.
- D) U.S. Pat. No. 8,834,082 issued on Sep. 16, 2014 to Landrum et al. for Wind Turbine Blade Railroad Transportation System and Method.
- E) U.S. Pat. No. 9,315,200 issued on Apr. 19, 2016 to Landrum et al. for Wind Turbine Blade Railroad Transportation With Two Axis Translation.
- F) U.S. Pat. No. 9,347,426 issued on May 24, 2016 to Landrum et al. for Wind Turbine Blade Railroad Transportation System and Method.
- G) U.S. Pat. No. 9,494,140 issued on Nov. 15, 2016 to Sigurdsson for Frame Support Assembly For Transporting Wind Turbine Blades.
- H) U.S. Pat. No. 9,567,969 issued on Feb. 14, 2017 to Sigurdsson for Systems and Methods For Transporting Wind Turbine Blades.
- I) U.S. Pat. No. 9,790,927 issued on Oct. 17, 2017 to Landrum et al. for Wind Turbine Blade Double Pivot Transportation System and Method.
- J) U.S. Pat. No. 10,030,633 issued Jul. 24, 2018 to Sigurdsson for System and Method for Transporting Wind Turbine Blades.

It should be noted that the fixtures, stands, bolsters, and other attachment equipment used to transport wind turbine blades represent a substantial investment and cost factor, so that fixture design considerations present opportunities for streamlining logistics of wind turbine blade transportation, as well as controlling the costs of doing so. It is desirable to use these structures across various modes of transportation where possible, as this saves on fixture cost and reduces the amount of handling required during intermodal operations. As the scale of wind turbine blades continues to grow in length and capacity, suppliers of logistics fixtures and services continue to address the challenges by developing new fixtures sets to support and transport these blades. Such ongoing fixture development and deployment processes represent a substantial cost in the logistics of wind turbine blade storage and transport. Thus it can be appreciated that there is a need in the art for improved fixtures having a more universal applicability to various, and increasingly larger, sizes of wind turbine blades.

SUMMARY OF THE INVENTION

The need in the art is addressed by the apparatuses of the present invention. The present disclosure teaches a fixture for supporting the root end of a wind turbine blade on a railcar, where the root end has a flange with an elongated blade extending therefrom along a first longitudinal axis toward a tip end. The fixture is suitable for use in conjunction with a rotatable tip end support fixture, to thereby facilitate rotation of the blade upon the fixtures. The fixture includes a main frame supported from the railcar by a main pivot assembly, which can pivot about both of a first vertical axis and a first lateral axis. A blade cradle is fixed to the main frame, and supportively engages the elongated blade adjacent to the root end of the blade. A frame arm extends away from the main frame. A root stand is supported from the frame arm by a stand pivot assembly, which pivots about a second vertical axis. A mounting flange adapter is fixed to the flange of the wind turbine blade, which is supported from the root stand by a flange pivot assembly that pivots about both a second lateral axis and a second longitudinal axis. The second longitudinal axis is substantially aligned with the first longitudinal axis. A counterweight is fixed to the main frame, and has a mass selected to balance the combined mass of the fixture components at a balance point adjacent to the first lateral axis, so as to balance the fixture about the main pivot assembly. The rotational orientation of the wind turbine blade about the first longitudinal axis is selectable according to the angular position between the mounting flange adaptor and the root stand about the second longitudinal axis. And, the longitudinal position of the wind turbine blade with respect to the railcar is controlled by the root stand.

In a specific embodiment of the foregoing fixture, the frame arm extends in a horizontal direction, substantially in parallel with the second longitudinal axis, to the stand pivot assembly.

In a specific embodiment, the foregoing fixture further includes a blade strap connected to the blade cradle and wrapped about the elongated blade to thereby retain the wind turbine blade in position upon the blade cradle.

In a specific embodiment, the foregoing fixture further includes a conformal inset disposed upon the blade cradle, which has a support surface conformed to a profile of the blade at point of support.

In a specific embodiment of the foregoing fixture, the main pivot assembly includes a rail car deck plate coupled to a main pivot plate about the first lateral axis by plural main lateral pivot bearings and a main lateral pivot shaft. In a refinement to this embodiment, the main pivot assembly further includes a main vertical pivot lower center plate fixed to the main pivot plate, which rotatably engages a main vertical pivot upper center plate fixed to the main frame, with a main vertical pivot center pin disposed between them.

In a specific embodiment of the foregoing fixture, the stand pivot assembly further includes a stand vertical pivot lower center plate fixed to the frame arm, that is pivotally engaged with a stand vertical pivot upper center plate fixed to the root stand, and having a stand vertical pivot center pin disposed between them.

In a specific embodiment of the foregoing fixture, the stand pivot assembly further includes plural side bearings plates disposed between a lower surface of the root stand and an upper surface of the frame arm, and disposed about the second vertical axis, to thereby stabilize the root stand.

In a specific embodiment of the foregoing fixture, the mounting flange adapter further includes a hub with plural radially oriented spokes extending therefrom, each having a flange attachment member at a distal end for attachment to the blade root end flange, and also has a spindle extending from the hub about the second longitudinal axis. In a refinement of this embodiment, the flange pivot assembly further includes a bearing mounting plate coupled to the root stand about the second lateral axis by plural flange lateral pivot bearings and a flange lateral pivot shaft, and a spindle cradle bearing fixed to the bearing mounting plate for pivotally supporting the spindle about the second longitudinal axis.

In a specific embodiment of the foregoing fixture further includes an alignment plate disposed between the hub and the bearing mounting plate, having plural alignment holes for receiving at least a first bolt to fixedly align the angular position between the mounting flange adapter and the root stand.

In a refinement to the foregoing fixture, the main vertical pivot lower center plate and the main vertical pivot upper center plate are selected from railroad industry standard center plates as are employed in the engagement of railcar truck assembly bolsters to railcar frames. In a refinement to this embodiment, the fixture further includes a railroad industry standard center bowl liner disposed between the main vertical pivot lower center plate and the main vertical pivot upper center plate.

In a refinement to the foregoing fixture, the stand vertical pivot lower center plate and the a stand vertical pivot upper center plate are selected from railroad industry standard center plates as are employed in the engagement of railcar truck assembly bolsters to railcar frames.

The present disclosure teaches a support fixture for use on a railcar to transport a wind turbine blade that has a mounting flange. The support fixture includes a main frame supported from the railcar by a main pivot, which pivots about a first vertical axis and a first lateral axis, and the main frame has a frame arm extending from it. The main frame supports the wind turbine blade at a distance away from the mounting flange. The support fixture also includes a root stand supported from the frame arm, and a mounting flange adapter supported from the root stand by a flange pivot, which pivots about a second lateral axis and a longitudinal axis. The mounting flange adapter is configured for fixed attachment to the mounting flange. A counterweight is disposed upon the main frame, and has a mass selected to balance the combined mass of the main frame, the frame arm, the root stand, and the mounting flange adapter at a balance point adjacent to the first lateral axis. The rotational orientation of the wind turbine blade about the longitudinal axis is selectable according to the angular position between the mounting flange adaptor and the root stand. In addition, the wind turbine blade longitudinal position with respect to the railcar is located by the root stand.

In a specific embodiment, the foregoing support fixture further includes a blade cradle disposed between the main frame and the wind turbine blade, which has a conformal inset disposed upon the blade cradle that has a support surface conformed to a profile of the wind turbine blade at the position of support.

In a specific embodiment, the foregoing support fixture includes a stand pivot assembly disposed between the frame arm and the root stand, which pivots about a second vertical axis.

In s specific embodiment of the foregoing support fixture, the mounting flange adapter further includes a hub with plural radially oriented spokes extending therefrom, where each spoke has a flange attachment member at its distal end for attachment to the mounting flange of the wind turbine blade, and the mounting flange adapter also has a spindle extending from the hub along the longitudinal axis. In a refinement to this embodiment, the flange pivot assembly further includes a bearing mounting plate coupled to the root stand along the second lateral axis, and also, a spindle cradle bearing attached to the bearing mounting plate that pivotally supports the spindle along the longitudinal axis. In a further refinement, an alignment plate is disposed between the hub and the bearing mounting plate, and it has plural alignment holes for receiving at least a first bolt for fixedly aligning the angular position between the mounting flange adapter and the root stand.

BRIEF DESCRIPTION OF THE DRAWINGS

FIG. 2 is a plan view drawing of plural railcars supporting a wind turbine blade on support fixtures according to an illustrative embodiment of the present invention.

FIG. 3 is a side view drawing of plural railcars supporting a wind turbine blade on support fixtures according to an illustrative embodiment of the present invention.

DESCRIPTION OF THE INVENTION

Figure 1:
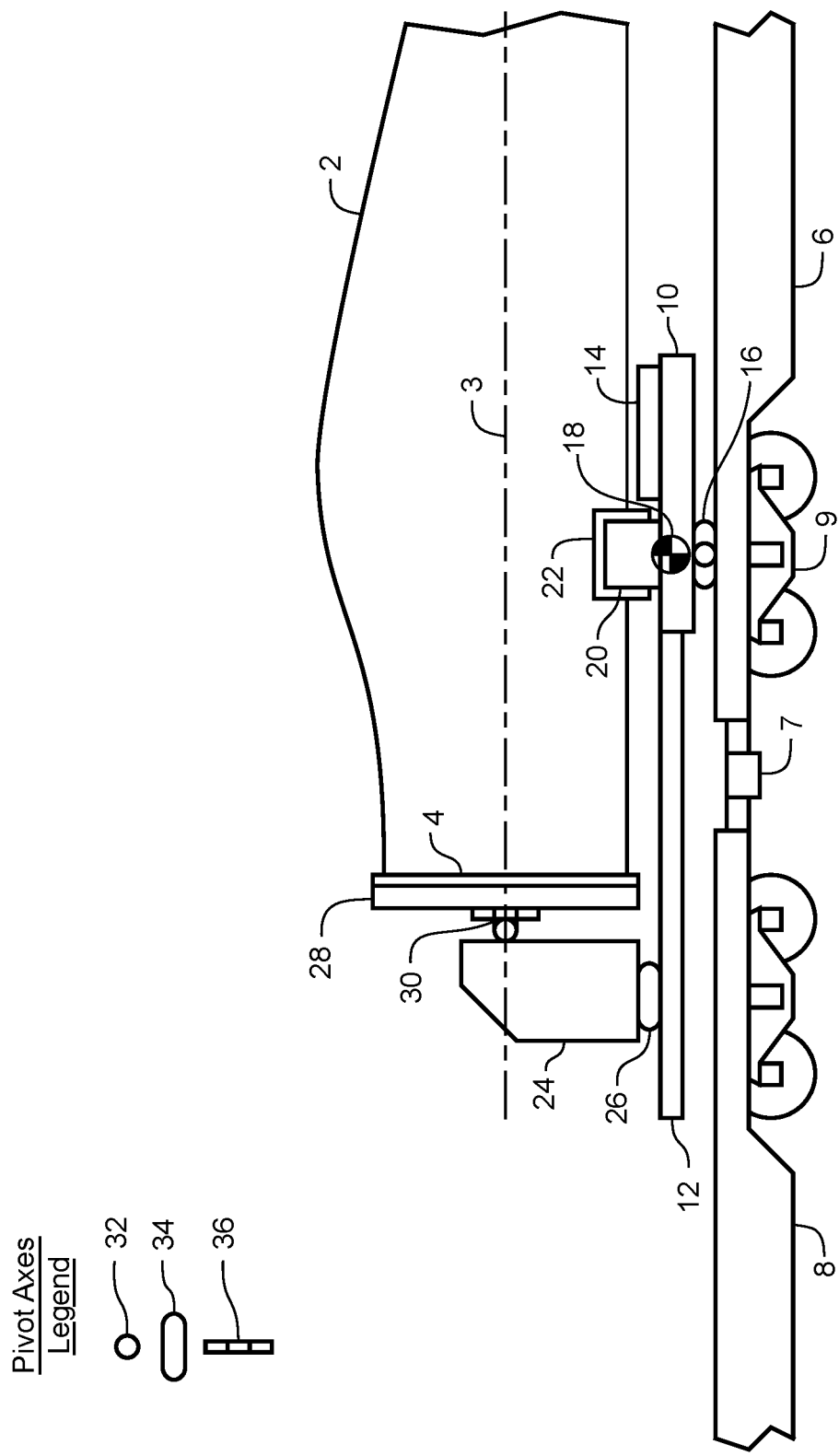
FIG. 1 is a schematic diagram of a universal root end support fixture supporting a wind turbine blade on a railcar according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Those skilled in the art of wind turbine blade logistics, particularly with regard to railroad transport, will be aware of the challenges in loading, securing, and transporting long structures, such as wind turbine blades (also referred to herein as a "blade"). At the time of this writing, commercial wind turbine blades range in length from approximately 48 meters to 71 meters, and longer blades are envisioned by suppliers. As such, these blades are much longer than the typical railcar. For example, the common rail flatcar is about 27 meters in length. Therefore, multiple railcars must be coupled together to provide adequate length to carry a single wind turbine blade, which may require two, three, or even four railcars joined together. The coupling of plural railcars to provide adequate length may hereinafter be referred to as a "consist" of railcars. The blade must be supported on at least two support fixtures and aligned along the longitudinal axis of the consist of railcars. As a side note for this disclosure, an axis generally aligned with the length of a consist of railcars will be referred to as a "longitudinal" axis. An axis that is generally transverse to a longitudinal axis, such as side-to-side of a railcar, will be referred to as a "lateral" axis. And, vertically aligned axes will be referred to as "vertical" axes. For example, the longitudinal axis of a wind turbine blade is generally aligned with the longitudinal axis of a consist of railcars. Although, there may be several angular degrees of misalignment with respect to these reference directions, as will be appreciated by those skilled in the art.

Since two support fixtures, minimum, are required to support a wind turbine blade, and since a consist may include more than two railcars, some of the railcars in a consist may be load bearing cars, referred to as "load" cars, and some railcars may be non load bearing cars, referred to a "idler" cars. It will be appreciated by those skilled in the art that the total mass borne by a railcar must result in a center of mass that is close to the longitudinal axis of the railcars and consist so as to avoid excessive tipping forces. Sometimes it is necessary to add counterweights to a railcar where the actual load cannot be so aligned. This is sometime the case for long, curved, wind turbine blades. It will also be appreciated that concentrated loads are preferably located directly above a railcar truck assembly so as to limit bending stresses along the railcar frame.

Longer wind turbine blades are commonly designed with a curved airfoil design, the 'flattens' out under wind loading. However, during transport, the curved shape, sometimes referred to as a "hockey stick" shape, must be addressed with respect to railway clearances. The logistics of wind turbine blade rail transport are facing increasing clearance issues as the blades become longer, and this challenge is exacerbated where the blade is curved. Considering the curvature of railroad tracks, and the undulations over hills and valleys, and the differences between how a consist of railcars traverse a curved section of rail, as compared to the relatively fixed shape of wind turbine blades, and it can be appreciated that clearance logistics is a major consideration in support fixture design and placement. With a two-point support system as discussed above, and the consist of railcars following a curved track, it can be appreciated that the blade axis generally defines a geometric chord along the curved track, where the ends and center portions of the blade overhang the clearance profile more so than where the track section is straight.

To address the foregoing issues, logistics engineers have designed specialized support fixtures base on particular blade sizes and shapes that provide axes of pivot, both vertically and laterally, and fixtures the provide lateral translation of the support point as a consist rounds a curved section of track, so as to address clearance issues. Reference is directed to the patents listed in the Background section of this disclosure for such examples. Each of these fixture sets are designed to provide the narrowest clearance profile so that the consist can be routed through the greatest number of acceptable railroad routings. Another aspect of the transport of wind turbine blades is the height of the railcar, support fixtures and blade, particularly, the broadest blade section, which is generally adjacent the root end of the blade where would be attached to a wind generator. By rotating the blade along its longitudinal axis, the height can be limited, however, such rotation may also increase lateral clearance issues. Each blade design and each consist arrangement requires considered engineering attention with respect to these clearance issues.

As can be appreciated from the foregoing discussion, the use of custom and specific designed fixtures for each blade type has been commonly employed in the field of wind turbine blade logistics. This is a relatively expensive approach and results in fixture sets that become obsolete as wind turbine blade designs evolve over time. The present disclosure teaches an improved support fixture for use adjacent the root end of a wind turbine blades, which enables a more universal applicability for wind turbine blades of various lengths, curvatures, and blade depths. This fixture provides, among other features, adjustable rotational orientation about the longitudinal axis of the blade, and is thus appropriate for use with a blade tip end fixture that also enables such rotation.

Reference is directed to FIG. 1, which is a schematic diagram of a universal root end support fixture assembly for supporting a wind turbine blade 2 on a railcar 6 according to an illustrative embodiment of the present invention. This embodiment employs plural pivot axes, which are depicted schematically in this drawing figure. A Pivot Axes Legend is provided as a convenient reference. Lateral axes 32 are depicted in the drawing using a circle, as illustrated. Vertical axes 34 are depicted as elongated ovals, as illustrated. And, longitudinal axes 36 are depicted as overlapped rectangles, as illustrated. Now, returning to the substance of FIG. 1, two rail flatcars 6, 8 are joined by a couplers 7 into a consist, where flatcar 6 is a load car and flatcar 8 is an idler car. A main pivot assembly 16 rests upon the load car 6 directly above the truck assembly 9, so as to transfer the weight directly through the truck assembly 9. Main pivot assembly 16 provides both a vertical pivot axis and a lateral pivot axis. The vertical axis enables the blade 2 to rotate and align with a tip end fixture (not shown), which also provides its own vertical pivot axis. In this way, the blade 2 can align as a geometric chord of the curved track section as the consist rounds a curve in the railway (not shown). The lateral pivot axis of main pivot assembly 16 enables the blade 2 to incline and decline as the consist traverses a railway having hills and valleys.

The main pivot assembly 16 of FIG. 1 supports a main frame 10, which is comprised of suitable structural steel members in the illustrative embodiment. A blade cradle 20 rest on top of the main frame 10, and supports the blade at a suitable distance from the blade 2 root end flange 4. This distance is selected to optimize the clearance profile of the loaded consist. In order to provide a more universal adaptability of the assembly, the blade cradle is shaped to accommodate the largest blade 2 required for the scope of design of the system. Smaller blades are accommodated by providing a conformal insert 22, which is placed on the larger blade cradle 20, and has a smaller surface that is conformed to a profile of the blade 2 at the actual location of support.

A frame arm 12 extends horizontally away from the main frame 10, in the direction of the root end flange 4 of the blade 2. In this embodiment, the frame arm 12 extends past the end of the load car 6 and over the idler car 8. This is useful for arranging the blade over plural railcars, keeping in mind the overhang effect on the clearance profile in doing so. Toward the distal end of the frame arm 12 is a root stand 24 that is pivotally supported by a stand pivot assembly 26. The stand pivot assembly 26 enables pivotal movement about a second vertical axis. The purpose of the root stand 24 is to support a mounting flange adapter 28 that is connected to the root end flange 4 of the blade 2. The combination of these components hold the blade 2 against longitudinal movement with respect to the load car 6. Even though straps or other logistics components could be employed to provide added longitudinal securement, AAR (American Association of Railroads) open top loading rule required a structural fixture to achieve this objective, and the root stand 24 and it associated elements satisfy this requirement. Note that the mounting flange adapter 28 is connected to the root stand 24 using a flange pivot assembly 30, which enables pivotal movement about a second lateral axis and along the longitudinal axes 3 of the blade 2.

The pivotal movement about the longitudinal axis 3 enabled by the flange pivot assembly 30 provides for selective control of the rotational angle between the blade 2 and the root stand 24. With this degree of control, engineers are able to select and control the height profile of the blade 2 on the consist of railcars 6, 8. Note also that the vertical pivot of stand pivot assembly 26 and the lateral pivot of flange pivot 30 enables the universality of the fixture set for a wide range of blade loading configurations, as there will be a need for small angular adjustments to achieve proper rail car loading, and management of the overhang and clearance profile issues discussed hereinbefore. These degrees of adjustment enable the universality of the fixture assembly as a whole. Also note that the centerline of the longitudinal axis of the flange pivot assembly 30 and longitudinal axis 3 of the blade 2 do not necessarily have to be precisely aligned. In fact, some misalignment and/or eccentricity between these axes can be beneficial in controlling and tailoring the railcar loading and the railway clearance requirements of the system as whole across a range of blade sizes, weights, and lengths.

Another significant aspect of the root end fixture design in FIG. 1 is how the fixture components balance prior to resting the blade 2 thereupon. Since the frame arm 12 and root stand 24 extend away from the primary point of support, at the main pivot assembly 16, and since this pivot assembly can tip about its lateral axis, a counterweight 14 is provided on the opposing end of the main frame 10 to position a center of gravity 18 that is directly adjacent to the main pivot assembly 16, so the fixture is somewhat balanced as the blade 2 is loaded thereupon.

Reference is directed to FIG. 2 and FIG. 3, which are a plan view drawing and a side view drawing, respectively, of plural railcars supporting a wind turbine blade 50 on support fixtures 56, 48 according to an illustrative embodiment of the present invention. In this embodiment, a seventy-one meter long blade 50 is supported on a consist of railcars, including four eight-nine foot flatcars 40, 42, 44, and 46. Note that flatcar 40 is a load car carrying the weight of the wind turbine blade 50 through root end fixture assembly 56. Flatcar 44 is an idler car, providing clearance for blade 50 overhang at its root end 52. Similarly, flatcar 42 is a load car carrying the weight of the wind turbine blade 50 through tip end fixture assembly 48, while flatcar 46 is an idler car providing clearance for blade 50 tip end 54 overhang. Note that both of the support fixtures 56 and 48 are located directly above corresponding railcar truck assemblies. Note the orientation of the blade 50 in the plan view of FIG. 2. The blade 50 is offset from the centerline (not shown) of the consist for the purposes of both balance and overhang clearance, as discussed hereinbefore. The tip end support fixture 48 enables pivotal movement about all of the vertical, lateral, and longitudinal axis. The design of the tip end fixture 48 is beyond the scope of this disclosure, however, one example of such a fixture is the subject of co-pending U.S. patent application Ser. No. 16/552,625 filed on Aug. 8, 2019 for Rotatable Support Fixture for Wind Turbine Blade.

Figure 4:
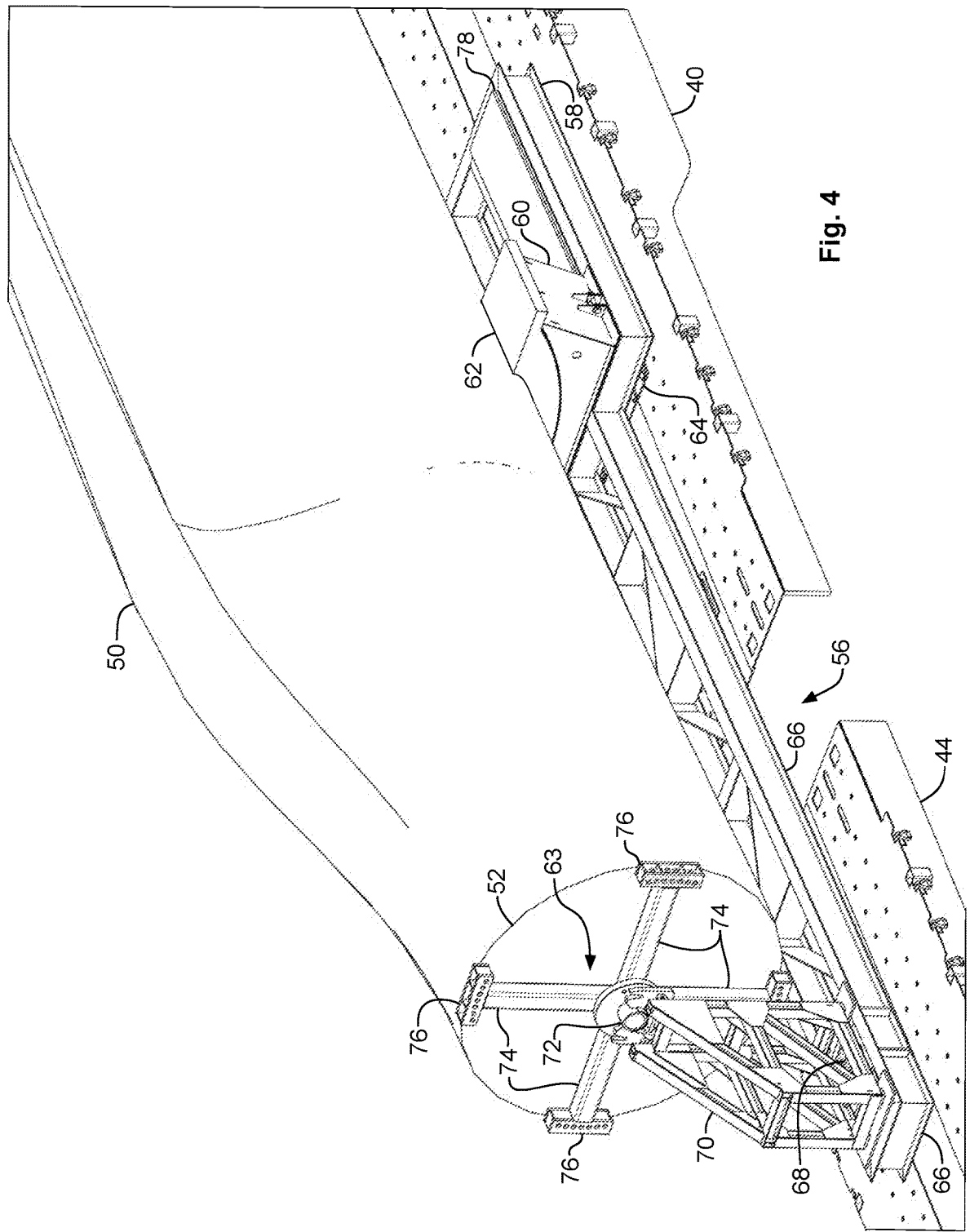
FIG. 4 is a perspective view drawing of a root end fixture supporting a wind turbine blade above a pair of railcars according to an illustrative embodiment of the present invention.

Reference is directed to FIG. 4, which is a perspective view drawing of a root end fixture assembly 56 supporting a wind turbine blade 50 above a pair of railcars 40, 44 according to an illustrative embodiment of the present invention. Flatcar 40 is the load bearing car and flatcar 44 is an idler car that provides clearance for the frame arm 66 and root end 52 of the wind turbine blade 50. The bulk of the weight of blade 50 is supported by conformal insert 62, which has an upper surface that conforms to the shape of the blade 50 at the point of support. The conformal insert 62 correspondingly rests upon blade cradle 60. Blade cradle 60 rests upon main frame 58 that is supported from load car 40 by a main pivot assembly 64, which is slightly visible on this drawing view. The main frame 58 is fabricated from mild steel structural components, and has counterweights 78 disposed thereupon for the purpose of balance, as described hereinbefore.

Continuing in FIG. 4, a frame arm 66 extends horizontally from main frame 58 in the direction of the root end 52 of wind turbine blade 50. The frame arm 66 is also fabricated from mild steel structural components, and is rigidly attached to the main frame 58. A root stand 70 is supported upon the frame arm 66 by a stand pivot assembly 68, which is only slightly visible in this drawing view. The root stand 70 is fabricated from mild steel structural sections and has flange pivot assembly 72 attached to an upper portion adjacent the rood end flange 52 of the wind turbine blade 50. The flange pivot assembly 72 supports a flange adaptor 63, comprising plural radially oriented spoke 74 having corresponding flange attachment members 76 positioned at the distal ends thereof, for attachment to the root flange 52 of the wind turbine blade 50. Further details of the stand pivot assembly 68 and flange pivot assembly 72 will be described hereinafter.

Figure 5:
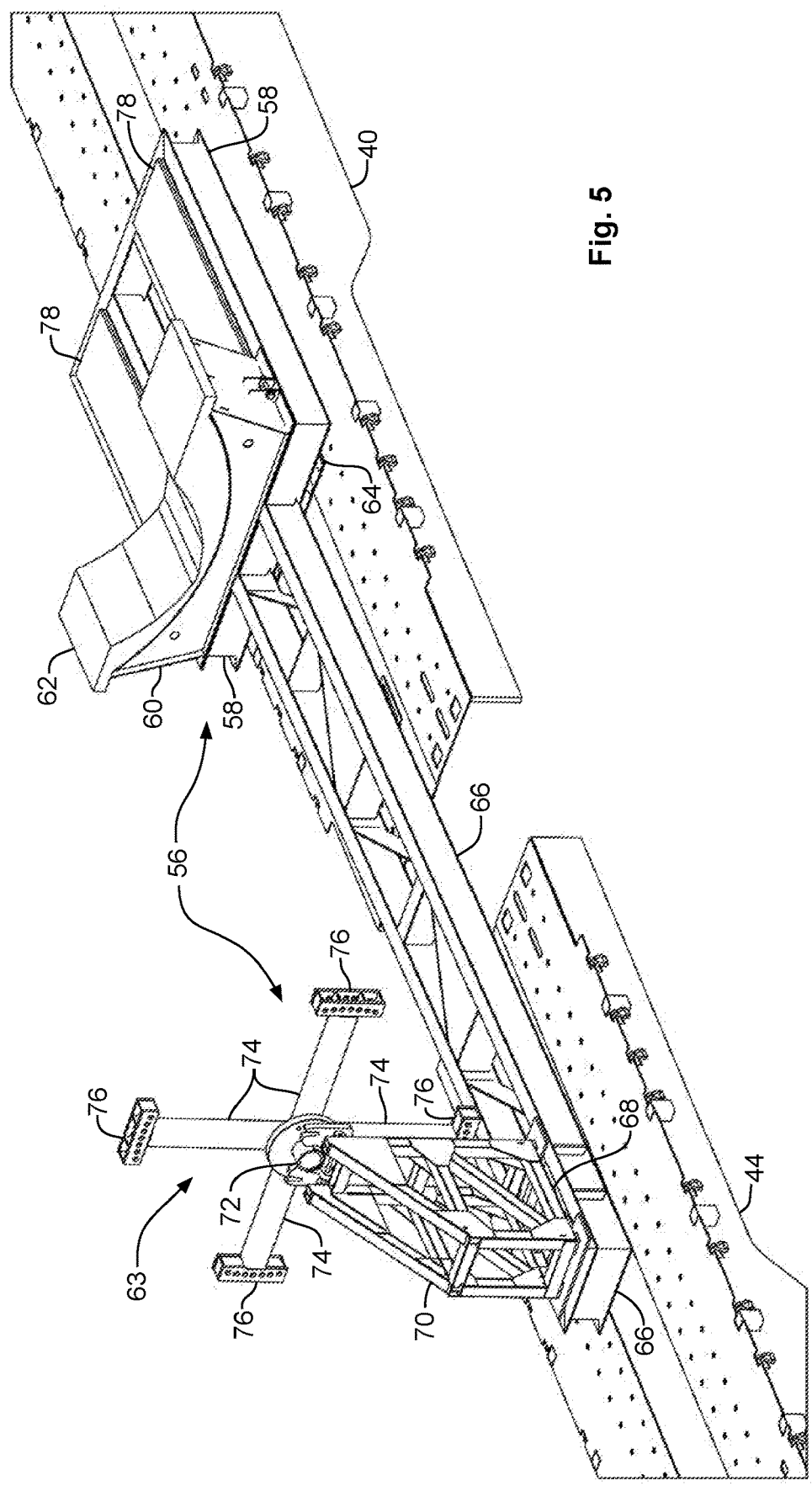
FIG. 5 is a perspective view drawing of a root end fixture disposed above a pair of railcars according to an illustrative embodiment of the present invention.

Reference is directed to FIG. 5, which is a perspective view drawing of a root end fixture 56 disposed above a pair of railcars 40, 44 according to an illustrative embodiment of the present invention. With the wind turbine blade removed from this drawing view, the conformal insert 62 and its upper surface that conforms to the shape of the blade 50 (not shown) at the point of support is clearly visible. The conformal insert 62 rests upon a larger arcuate shape of blade cradle 60. Blade cradle 60 rests upon main frame 58 that is supported from load car 40 by a main pivot assembly 64, which is slightly visible on this drawing view. The main frame 58 has counterweights 78 disposed thereupon for the purpose of balance, as described hereinbefore. The frame arm 66 extends horizontally from main frame 58. The root stand 70 is supported upon the frame arm 66 by a stand pivot assembly 68, which is only slightly visible in this drawing view. The root stand 70 has flange pivot assembly 72 attached to an upper portion thereof, which supports the flange adaptor 63, comprising the plural radially oriented spokes 74 and corresponding flange attachment members 76 at the distal ends thereof, for attachment to the root flange 52 (not shown) of the wind turbine blade 50 (not shown).

Figure 6:
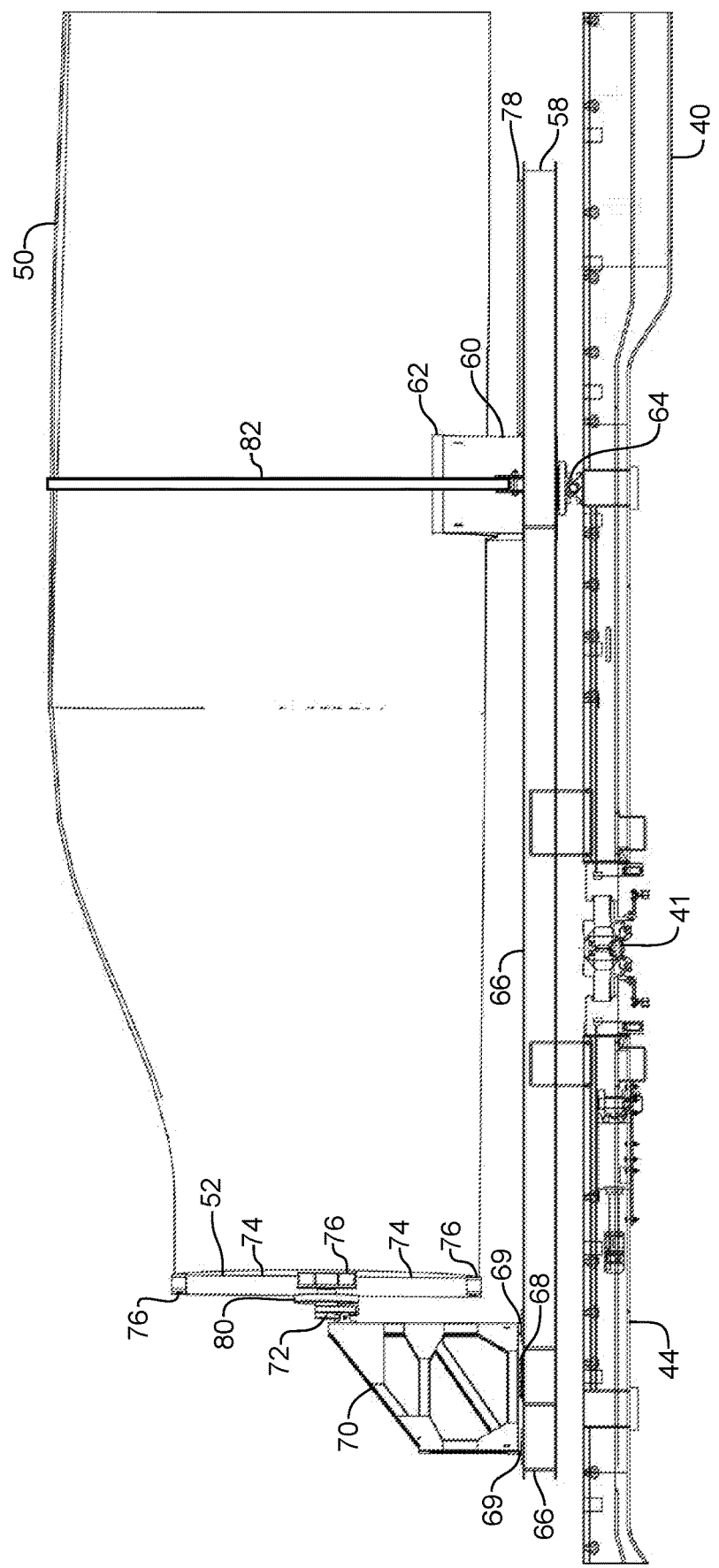
FIG. 6 is a side view drawing of a root end fixture supporting a wind turbine blade above a pair of railcars according to an illustrative embodiment of the present invention.

Reference is directed to FIG. 6, which is a side view drawing of a root end fixture supporting a wind turbine blade 50 above a pair of railcars 40, 44 according to an illustrative embodiment of the present invention. This FIG. 6 corresponds to FIGS. 4 and 5. The two flatcars 40, 44 are joined by couplers 41. The main pivot assembly 64 is disposed upon flatcar 40 and supports main frame 58, and pivots about a first lateral axis and a first vertical axis. The main frame 58 has frame arm 66 extending therefrom over flatcar 44, and also has counter weights 78 disposed thereupon. The blade cradle 60 and conformal insert 62 are visible. Note that a webbing strap 82 is fixed to the blade cradle 60 and is routed over blade 50 and is tightened to secure the blade 50 in place upon the conformal insert 62.

The blade stand 70 is supported about a second vertical pivot axis by stand pivot assembly 68. In addition, plural side bearing plates 69 are disposed between the frame extension 66 and the root stand 70 to stabilize the root frame 70 against any tipping movement. The flange pivot assembly 72 is fixed to the root stand 70, and engaged a hub 80 that is connected to the radial spokes 74 with flange attachment members 76. The root flange 52 of the wind turbine blade 50 is bolted to the plural flange attachment members 76.

Figure 7:
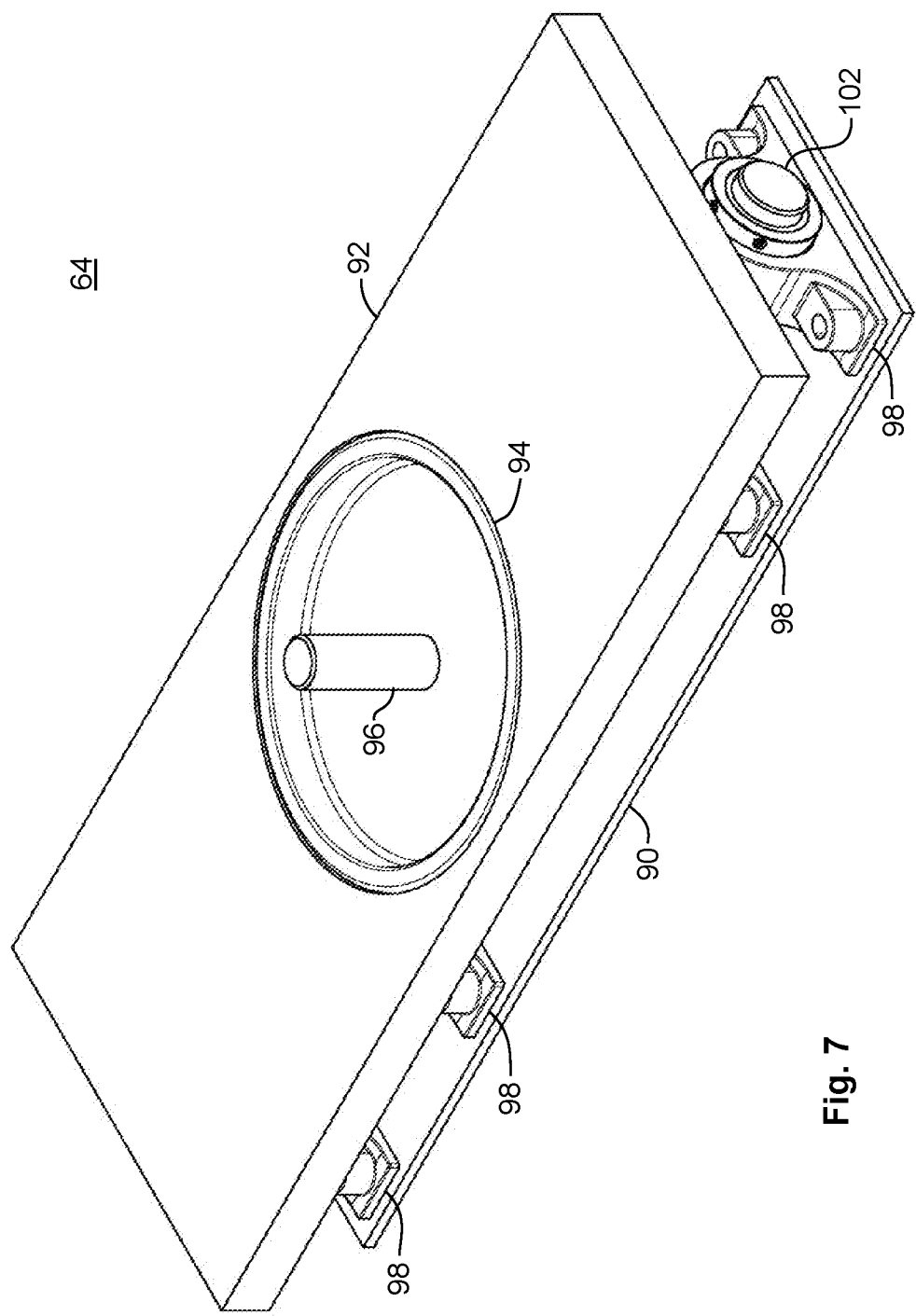
FIG. 7 is a perspective view drawing of a main pivot assembly according to an illustrative embodiment of the present invention.

Reference is directed to FIG. 7, which is a perspective view drawing of a main pivot assembly 64 according to an illustrative embodiment of the present invention. The assembly 64 includes a rail car deck plate 90, which is a steel plate that is attached to the host railcar deck (not shown), typically by welding. A main pivot plate 92 is pivotally supported from the rail car deck plate 90 by plural main lateral pivot bearings 98 engaged by a main lateral pivot shaft 102, which defines the first lateral pivot axis of the present disclosure. The plural main lateral pivot bearings 98 are pillow block bearings of suitable load capacity. On the upper surface of the main pivot plate 92, there is disposed a main vertical pivot center plate 94 with a main vertical pivot center pin 96. The main pivot bearing assembly 64 advantageously utilizes railroad industry standard center plate bearing assemblies commonly utilized in railcars between the railcar truck assembly bolster and the railcar frame. These vertical axis bearing assemblies are well known in the art, they are suitable to carry the entire load rating of such railcars, and are know to have sufficient load carrying capacity and wear characteristics that easily surpass the requirements of the present main bearing pivot assembly loading requirements.

Figure 8:
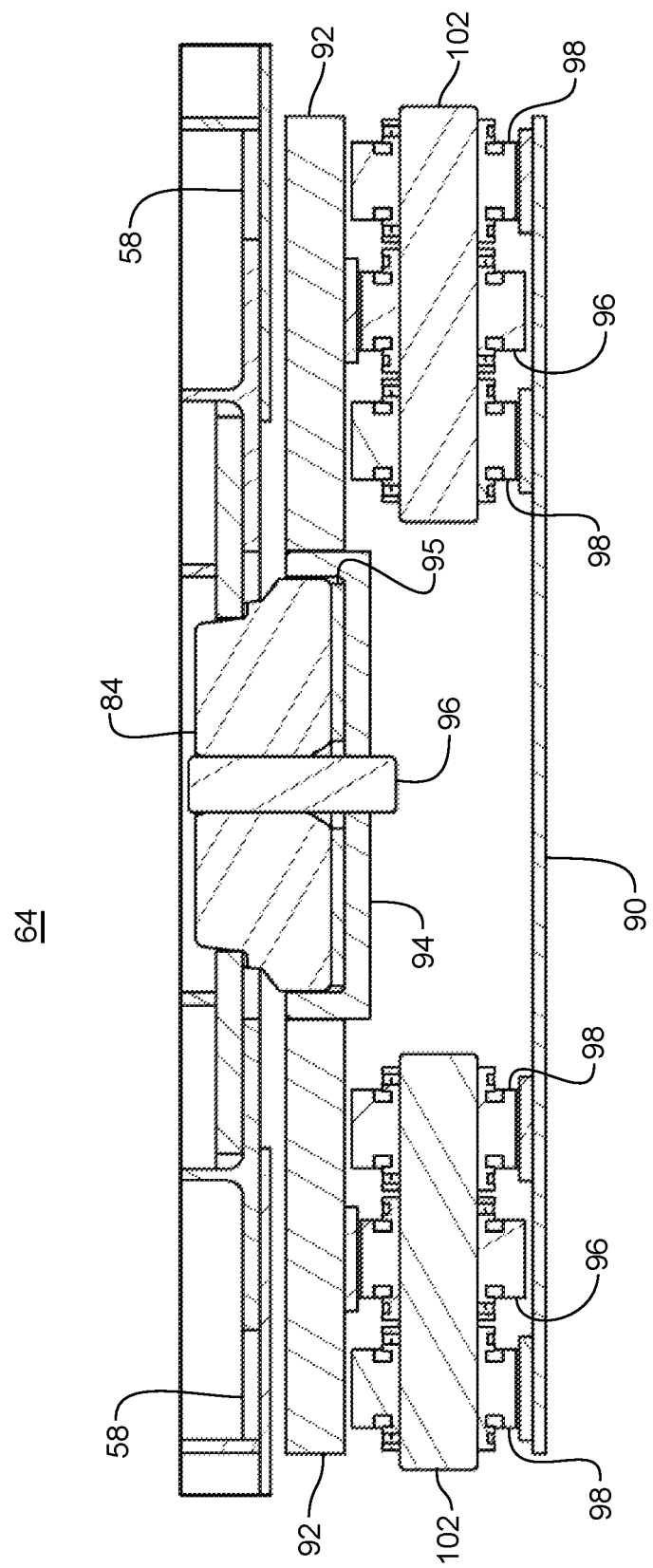
FIG. 8 is a section view drawing of a main pivot assembly according to an illustrative embodiment of the present invention.

Reference is directed to FIG. 8, which is a section view drawing of a main pivot assembly 64 according to an illustrative embodiment of the present invention. This FIG. 8 corresponds to FIG. 7. The assembly 64 includes the rail car deck plate 90 and the main pivot plate 92. In this section view, it can be seen that the plural main lateral pivot bearings include both lower bearings 98 that are fixed to the railcar deck plate 90, and upper bearings 96 that are connected to the main pivot plate 92, and these are pivotally joined by the main lateral pivot shaft 102, which defines the first lateral pivot axis of the present disclosure.

In FIG. 8, a portion of the main frame 58 is presented, so as to reveal how the main vertical pivot axis is arranged by use of a main vertical pivot lower center plate 94 that is fixed to the main pivot plate 92, and which is pivotally engaged with a main vertical pivot upper center plate 84, which is fixed to the main frame 58. The lower 94 and upper 84 center plates are aligned with a main vertical pivot center pin 96. Also note that a center bowl liner 95 is disposed between center plates 84 and 94, which reduces friction and reduces wear, and which is also a railroad industry standard component, as will be appreciated by those skilled in the art.

Figure 9:
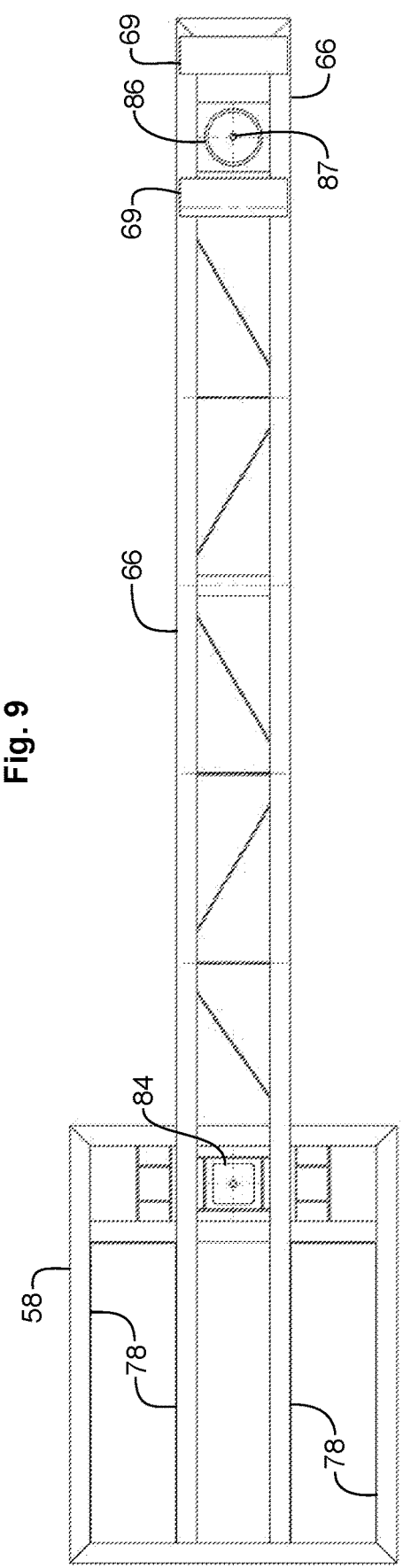
FIG. 9 is a plan view drawing of a root end frame assembly according to an illustrative embodiment of the present invention.
Figure 10:
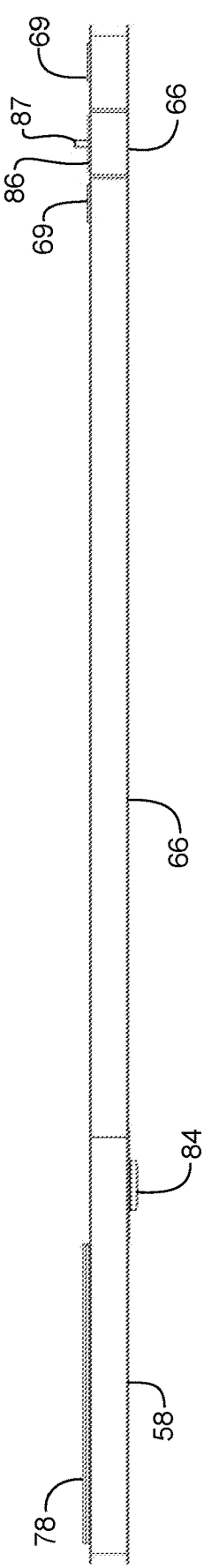
FIG. 10 is a side view drawing of a root end frame assembly according to an illustrative embodiment of the present invention.

Reference is directed to FIG. 9 and FIG. 10, which are a plan view drawing and a side view drawing, respectively, of a root end frame assembly comprising a main frame portion 58 and a frame arm portion 66, according to an illustrative embodiment of the present invention. Both of these portions are fabricated form mild steel structural components, such as I-beans, C-channel, angle irons, and fabricated plates. They are rigidly fixed to one another about a horizontal form factor, and certain structural members may be contiguous between the two portions 58, 66. The counterweights 78, which are steel plates in the illustrative embodiment, are attached to the main frame portion 58, and serve to balance the fixture, as was described hereinbefore. Other materials could also be employed as counterweights. The main vertical pivot upper center plate 84 is attached to the main frame 58, such as by welding or other suitable fastening arrangement, as will be appreciated by those skilled in the art.

The frame arm 66 in FIGS. 9 and 10 extend laterally from the main frame 58, and, at its distal end, a portion of the root stand pivot assembly is presented, which includes the stand vertical pivot lower center plate 86 and stand vertical pivot center pin 87. This defines the vertical axis about which the root stand (not shown) pivots. Note that stand pivot assembly also include plural side lower bearing plates 69, which engage corresponding side upper plates on the root stand (not shown), and which slideably engage one another to limit any tipping movement of the root stand (not shown).

Figure 11:
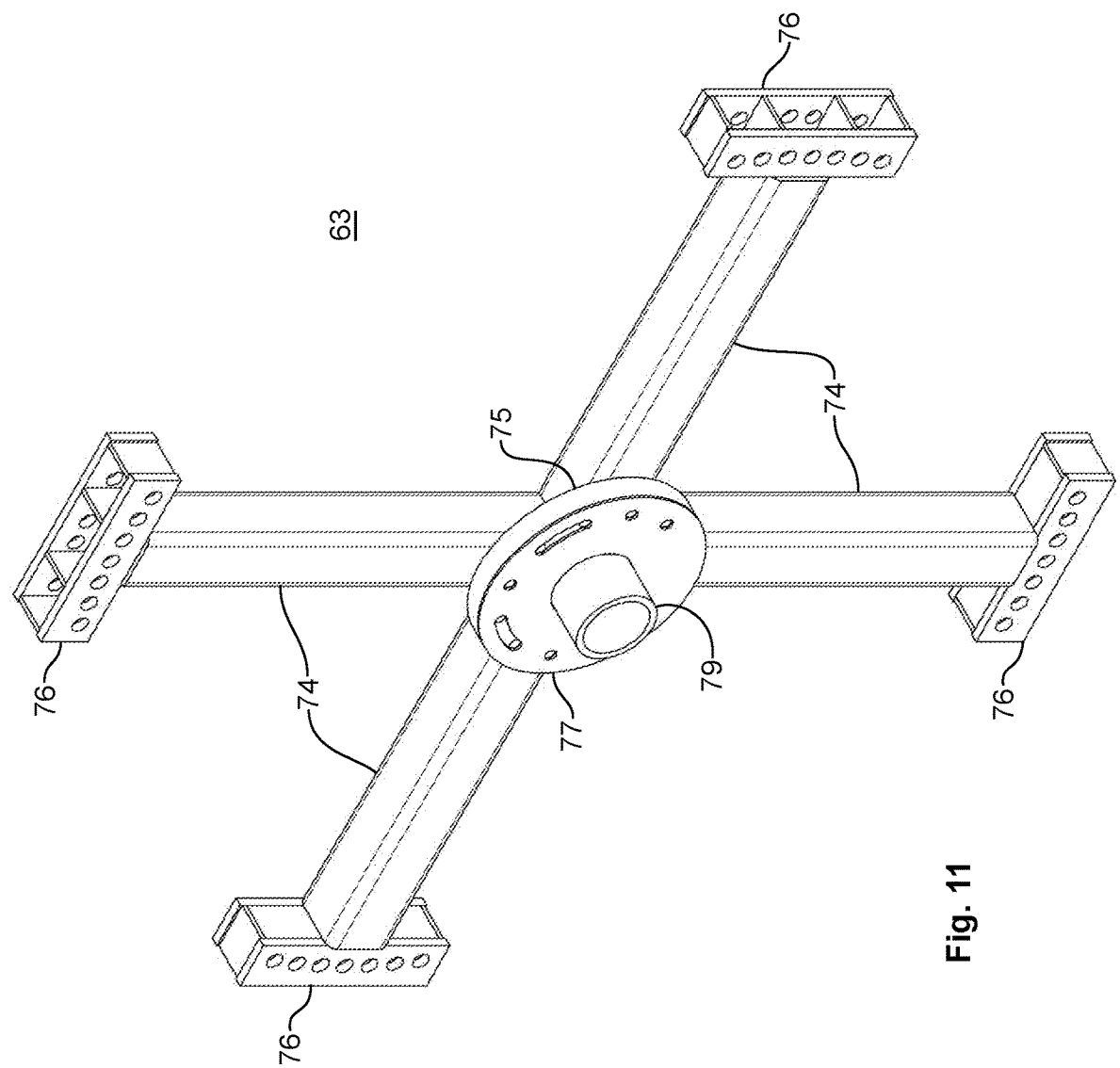
FIG. 11 is a perspective view drawing of a flange adapter assembly according to an illustrative embodiment of the present invention.

Reference is directed to FIG. 11, which is a perspective view drawing of a mounting flange adapter 63 according to an illustrative embodiment of the present invention. A circular hub 75 has plural radial spokes 74 extending therefrom, which are fabricated from structural tubing or other suitable material. At the distal end of each spoke 74 is a flange attachment member 76, which are bolted to the root end flange of the wind turbine blade (not shown). The attachment members 76 may be a flat plate with holes formed therethrough, or may be a boxed section as illustrated. The central hub 75 has a spindle 79 extending therefrom, which rotatably engages a cradle bearing (not shown) in the flange pivot assembly (not shown), along the longitudinal axis of the stand pivot assembly. Note that a circular alignment plate 77 is disposed along the spindle 79, which has plural holes and/or grooves formed through it. This plate 77 is useful for aligning the longitudinal rotational position orientation of the wind turbine blade (not shown) with respect to the root stand (not shown).

Figure 13:
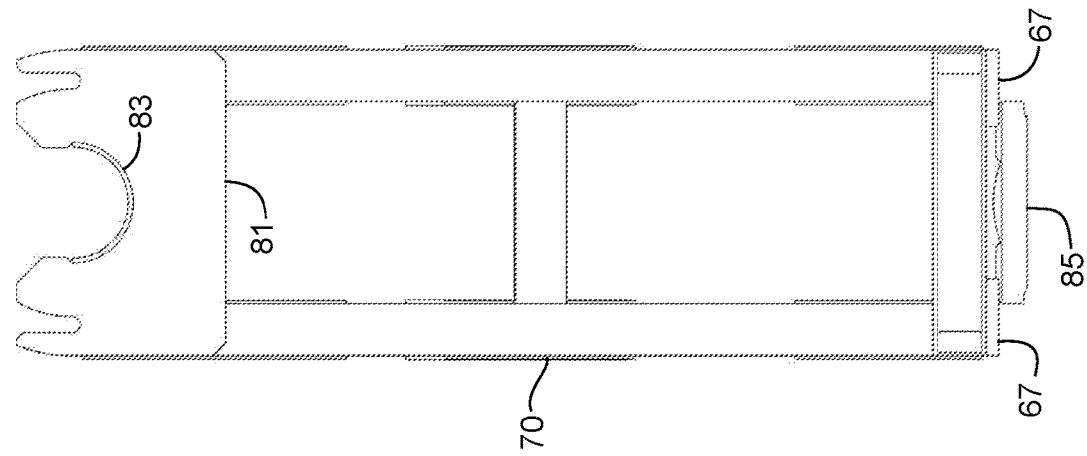
FIG. 13 is an end view drawing of a root stand assembly according to an illustrative embodiment of the present invention.
Figure 12:
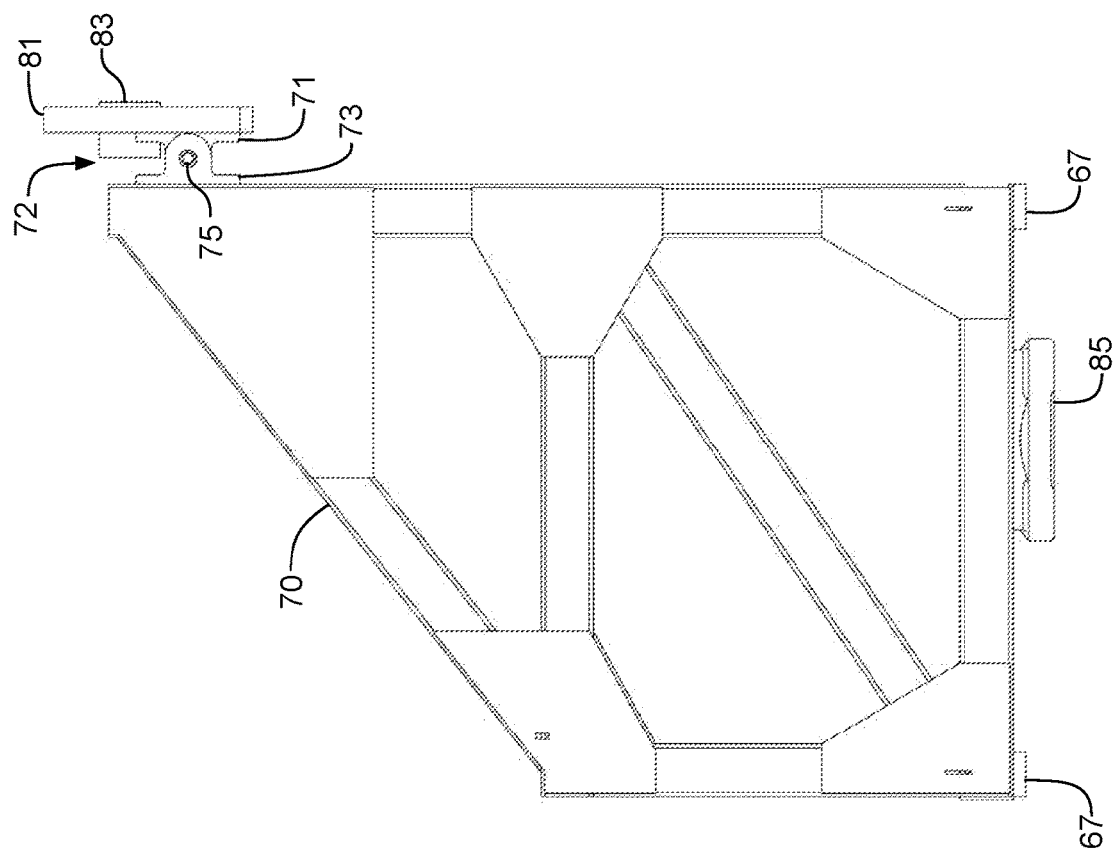
FIG. 12 is a side view drawing of a root stand assembly according to an illustrative embodiment of the present invention.

Reference is directed to FIG. 12 and FIG. 13, which are a side view drawing and an end view drawing, respectively, of a root stand assembly according to an illustrative embodiment of the present invention. The root stand 70 is fabricated from mild steel structural components. On a lower surface thereof, a stand vertical pivot upper center plate 85 is attached, which rotatably engages the stand vertical pivot lower center plate 86 (not shown) that is attached to the frame arm 66 (not shown). Thusly, the root stand 70 is enabled to pivot about the vertical axis defined by those center plates. The root stand 70 has a portion of the stand pivot assembly, namely the plural side upper bearing plates 67 attached to its lower surface, which slideably engage corresponding side lower plates on the frame arm 66 (not shown), which serve to limit any tipping movement of the root stand 70.

Continuing with regard to FIGS. 12 and 13, the flange pivot assembly 73 is also illustrated. This assembly 73 comprises plural flange lateral pivot bearings 71, 73 pivotally coupled by a flange lateral pivot shaft 75. These are pillow block type bearings of suitable load bearing capacity. Note that a portion of the plural flange lateral pivot bearings 73 are fixed to the root stand 70, and the other portion of the plural flange lateral pivot bearings 71 are fixed to a bearing mounting plate 81. In this manner, the bearing mounting plate is enable to pivot about the flange lateral pivot shaft 75. The bearing mounting plate 81 has a cradle bearing 83 disposed about a suitable opening for receiving and engaging the mounting flange adapter (not shown) spindle (not shown), to thereby rotate about a longitudinal axis, as described hereinbefore.

Figure 14:
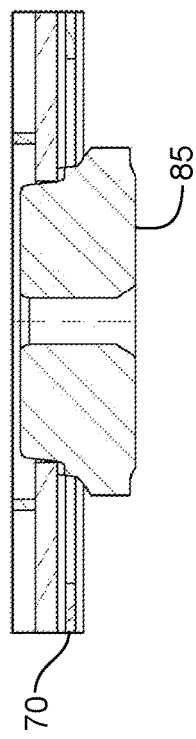
FIG. 14 is a section view drawing of the upper portion of a stand pivot assembly according to an illustrative embodiment of the present invention.
Figure 15:
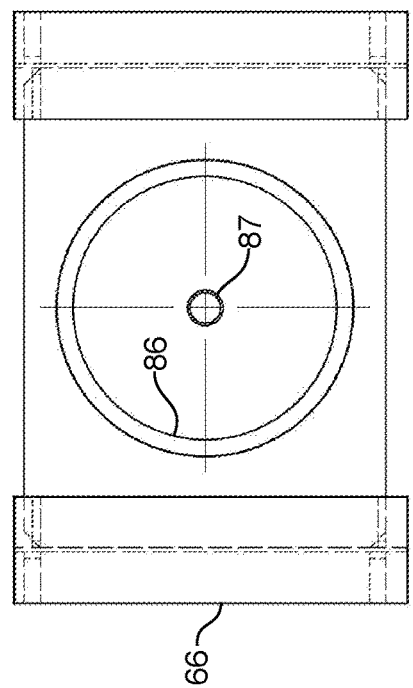
FIG. 15 is a top view drawing of the lower portion of a stand pivot assembly according to an illustrative embodiment of the present invention.
Figure 16:
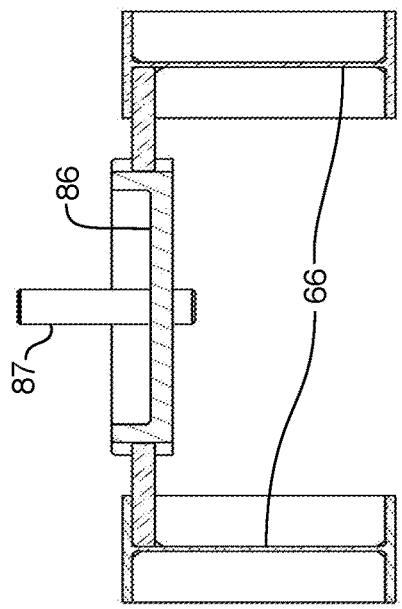
FIG. 16 is a section view drawing of the lower portion of a stand pivot assembly according to an illustrative embodiment of the present invention.

Reference is directed to FIG. 14, FIG. 15, and FIG. 16, which are a section view drawing of the upper portion of a stand pivot assembly, a top view drawing of the lower portion of a stand pivot assembly, and a section view drawing of the lower portion of a stand pivot assembly, respectively, according to an illustrative embodiment of the present invention. This assembly also advantageously utilizes railroad industry standard center plate bearing assemblies commonly utilized in railcars between the railcar truck assembly bolster and the railcar frame. These vertical axis bearing assemblies are well known in the art. In these Figures, the frame arm 66 is illustrate with the stand vertical pivot lower center plate 86 fixed thereto, and the stand vertical pivot center pin extending upwardly therefrom. In FIG. 14, a portion of the root stand 70 is illustrated with the stand vertical pivot upper center plate 85 fixed thereto. The center plates 85, 86 rotatably engage one another, as described hereinbefore.

Figure 17:
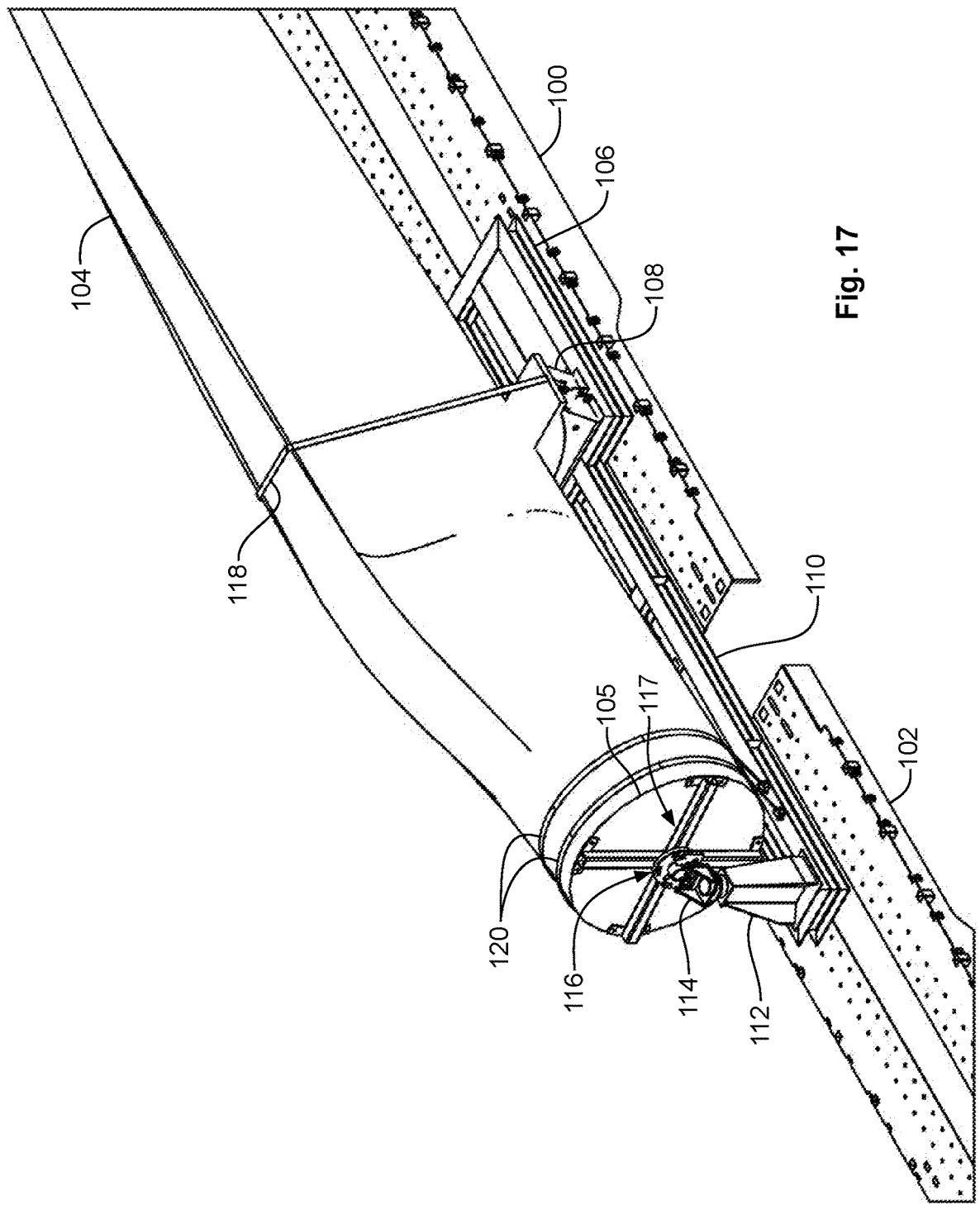
FIG. 17 is a perspective view drawing of a root end fixture supporting a wind turbine blade above a pair of railcars according to an illustrative embodiment of the present invention.

Reference is directed to FIG. 17, which is a perspective view drawing of a root end fixture supporting a wind turbine blade 104 above a pair of railcars 100, 102 according to an illustrative embodiment of the present invention. This embodiment presents another root stand configuration. The main frame 106 is supported above a load railcar 100. A blade cradle 108 supports the wind turbine blade 104, and includes a retention strap 118 to retain the blade 104 in place. A frame arm 110 extends therefrom over an idler railcar 102. A root stand 112 is fixed to the frame arm 110, and supports a flange bracket 114, which is pivotally engaged with the root stand 112 about a vertical axis of pivot. A flange pivot assembly 116 pivotally supports a flange adapter 117, which is fixed to the root flange 105 of the wind turbine blade 104. Note in this embodiment that two additional straps 120 are connected to the frame arm 110 and wrapped about the root end of the wind turbine blade 104. The primary difference between this illustrative embodiment and the prior illustrative embodiment is the structure of the rood stand 112 and the location of the stand pivot, which will be more fully described below.

Figure 18:
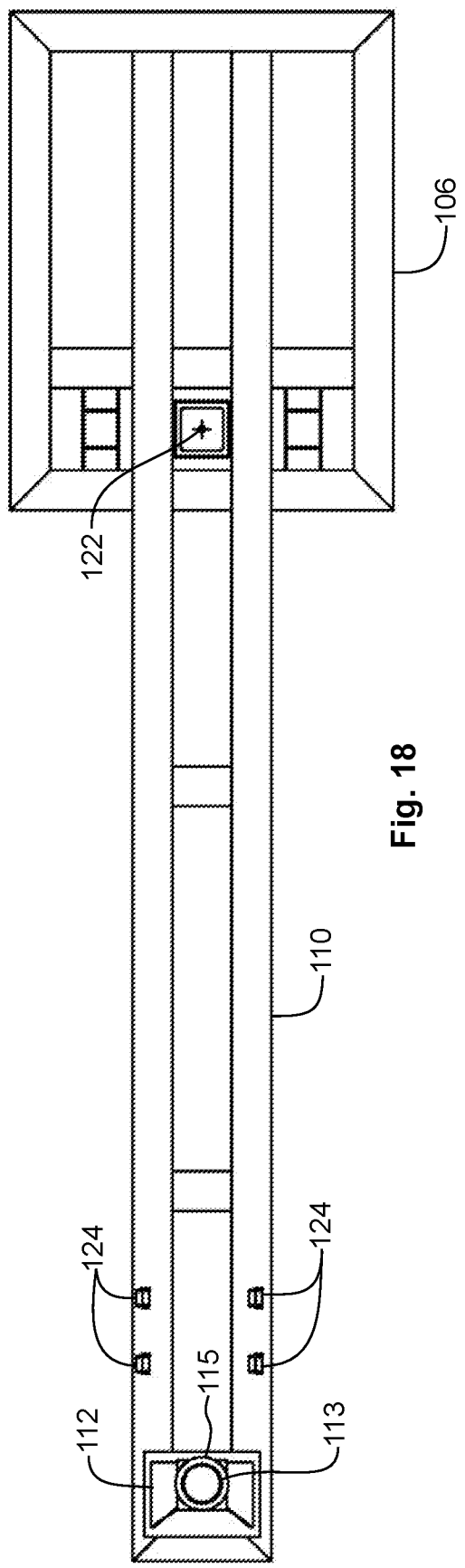
FIG. 18 is a plan view drawing of a root end frame assembly according to an illustrative embodiment of the present invention.
Figure 19:
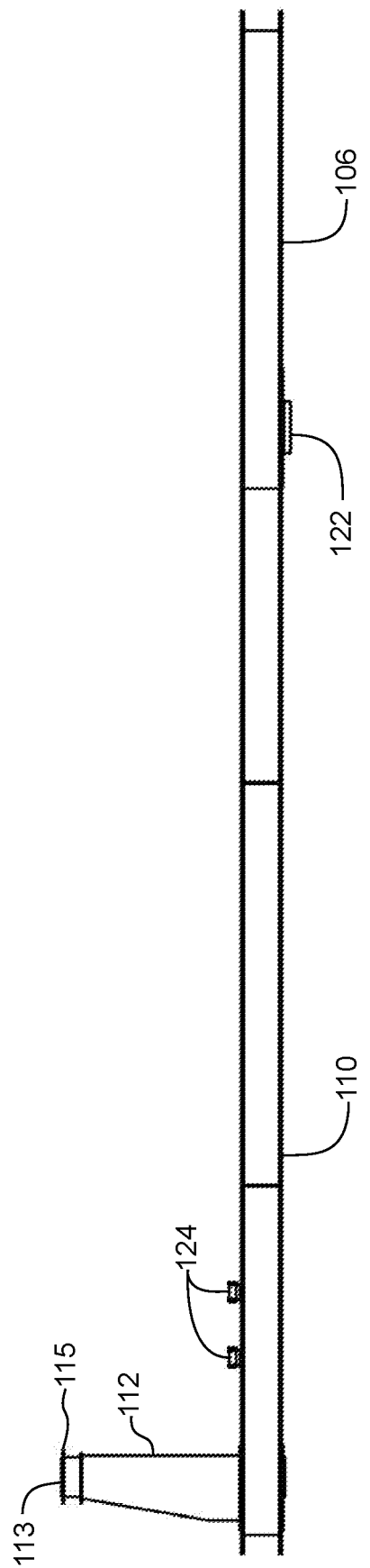
FIG. 19 is a side view drawing of a root end frame assembly according to an illustrative embodiment of the present invention.

Reference is directed to FIG. 18 and FIG. 19, which are a plan view drawing and a side view drawing, respectively, of a root end frame assembly according to an illustrative embodiment of the present invention. This drawing corresponds to FIG. 17. FIG. 18 illustrated a main frame 106 with frame arm 110 extending therefrom. The main pivot assembly upper center plate 122 is fixed to the main frame 106, as in the prior embodiments. At the distal end of the frame arm 110, a root stand 112 that is fixed to its upper side. The root stand 112 is configured with a vertically oriented bearing tube 113, which has a flange 115 at its upper end. The purpose of the bearing tube 113 is to receive a bearing shaft (not shown) that is coupled to the flange bracket (not shown), to thereby enable pivotal movement about a vertical axis.

Figure 21:
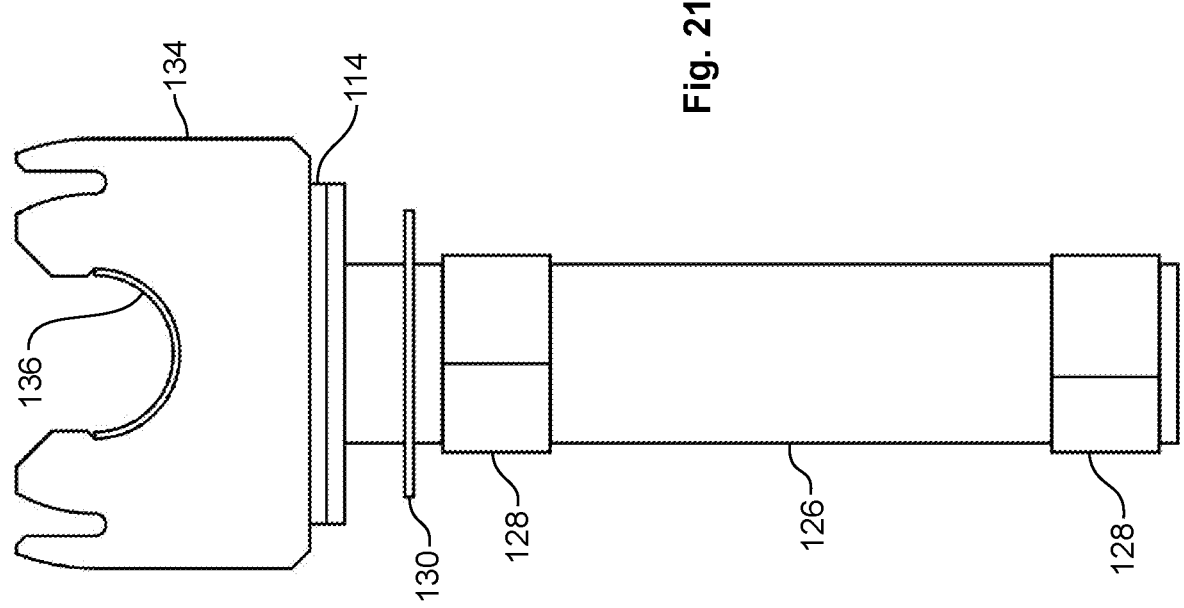
FIG. 21 is an end view drawing of a vertical pivot shaft and flange pivot assembly according to an illustrative embodiment of the present invention.
Figure 20:
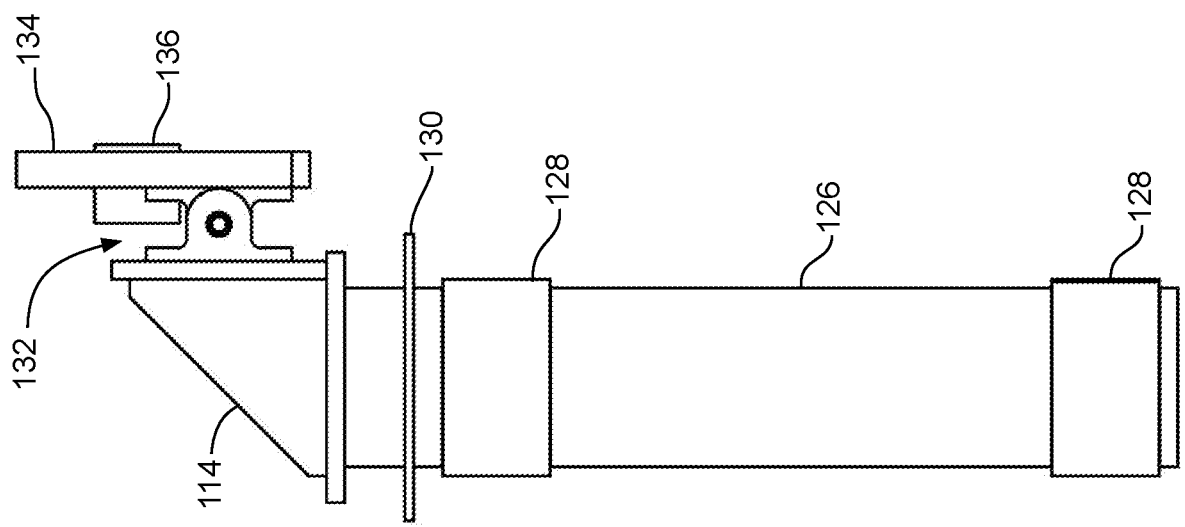
FIG. 20 is a side view drawing of a vertical pivot shaft and flange pivot assembly according to an illustrative embodiment of the present invention.

Reference is directed to FIG. 20 and FIG. 21, which are a side view drawing and an end view drawing, respectively, of a vertical pivot bearing shaft 126, flange bracket 114, and flange pivot assembly 132 according to an illustrative embodiment of the present invention. The bearing shaft 126 is sized for insertion into the bearing tube (item 113 in FIGS. 18 and 19) to enable a vertical pivot axis for the root end support structure. A pair of brass sleeves 128 are disposed about the bearing shaft to provide suitable bearing surfaces against the loads involved. A flange bracket 114 is fixed to the upper end of the bearing shaft 126. A stand pivot assembly 132 is fixed to a face of the flange bracket 114. The stand pivot assembly 132 is similar in configuration to the stand pivot assembly described hereinbefore. The stand pivot assembly 132 supports a bearing plate 134 having a cradle bearing 136 for receiving the spindle of the flange adapter, also as detailed hereinbefore. A flange 130 is disposed about the bearing shaft 126, which serves to engage the flange (item 113 in FIGS. 18 and 19) on the bearing tube (item 115 in FIGS. 118 and 119). A wear plate Not shown) may be inserted between the flanges to reduce friction and wear.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A fixture for supporting a root end of a wind turbine blade upon a railcar, the root end having a flange with an elongated blade extending therefrom along a first longitudinal axis toward a tip end thereof, said fixture suitable for use in conjunction with a rotatable tip end support fixture, the fixture comprising:
    a main frame supported from the railcar by a main pivot assembly, operable to pivot about both of a first vertical axis and a first lateral axis;
    a blade cradle fixed to said main frame, configured to supportively engage the elongated blade adjacent the root end thereof;
    a blade strap for connection to said blade cradle and for disposition about the elongated blade to thereby retain the wind turbine blade in position upon said blade cradle;
    a frame arm that extends from said main frame;
    a root stand supported from said frame arm and having a stand pivot assembly, operable to pivot about a second vertical axis;
    a mounting flange adapter for fixed attachment to the flange of the wind turbine blade, said mounting flange adapter supported from said root stand by a flange pivot assembly, operable to pivot about a second lateral axis and a second longitudinal axis, wherein said second longitudinal axis is substantially aligned with the first longitudinal axis;
    a counterweight fixed to said main frame, and having a mass selected to balance the combined mass of the foregoing elements at a balance point adjacent to said first lateral axis, and wherein
    rotational orientation of the wind turbine blade about the first longitudinal axis is selectable according to the angular position between said mounting flange adaptor and said root stand about said second longitudinal axis, and wherein
    a longitudinal position of the wind turbine blade with respect to the railcar is controlled by said root stand.

2. The fixture of claim 1, and wherein:
    said frame arm extends in a horizontal direction, substantially in parallel with said second longitudinal axis, to said stand pivot assembly.

3. The fixture of claim 1, and further comprising:
    a conformal inset disposed upon said blade cradle, having a support surface conformed to a profile of the elongated blade at a position of support.

4. The fixture of claim 1, and wherein said main pivot assembly further comprises:
    a rail car deck plate coupled to a main pivot plate about said first lateral axis by plural main lateral pivot bearings and a main lateral pivot shaft.

5. The fixture of claim 4, and wherein said main pivot assembly further comprises:
    a main vertical pivot lower center plate fixed to said main pivot plate, and rotatably engaged with a main vertical pivot upper center plate fixed to said main frame, and having a main vertical pivot center pin disposed therebetween.

6. The fixture of claim 5, and wherein said main vertical pivot lower center plate and said main vertical pivot upper center plate are selected from railroad industry standard center plates as are employed in the engagement of railcar truck assembly bolsters to railcar frames.

7. The fixture of claim 1, and wherein said stand pivot assembly further comprises:
    a stand vertical pivot lower center plate fixed to said frame arm, and pivotally engaged with a stand vertical pivot upper center plate fixed to said root stand, and having a stand vertical pivot center pin disposed therebetween.

8. The fixture of claim 7, and wherein said stand pivot assembly further comprises:
    plural side bearings plates disposed between a lower surface of said root stand and and an upper surface of said frame extension, and disposed about said second vertical axis, to thereby stabilize said root stand.

9. The fixture of claim 1, and wherein said stand pivot assembly further comprises:
    a vertically oriented bearing tube disposed within said root stand, which is fixed to said frame arm;

a bearing shaft for insertion into said bearing tube;

a flange bracket fixed to an upper end of said bearing shaft, which supports said flange pivot assembly and enables pivotal movement about said second vertical axis.

10. The fixture of claim 1, and wherein said mounting flange adapter further comprises:

a hub having plural radially oriented spokes extending therefrom, each having a flange attachment member at a distal end thereof for fixedly engaging the flange at the root end of the wind turbine blade, and having a spindle extending from said hub about said second longitudinal axis.

11. The fixture of claim 10, and wherein said flange pivot assembly further comprises:

a bearing mounting plate coupled to said root stand about said second lateral axis by plural flange lateral pivot bearings and a flange lateral pivot shaft, and a spindle cradle bearing fixed to said bearing mounting plate for pivotally supporting said spindle about said second longitudinal axis.

12. The fixture of claim 11, and further comprising:

an alignment plate disposed between said hub and said bearing mounting plate, having plural alignment holes for receiving at least a first bolt for fixedly aligning said angular position between said mounting flange adapter and said root stand.

13. The fixture of claim 12, further comprising:

a railroad industry standard center bowl liner disposed between said main vertical pivot lower center plate and said main vertical pivot upper center plate.

14. A support fixture for use on a railcar to transport a wind turbine blade having a mounting flange, comprising:

a main frame supported from the railcar by a main pivot, which pivots about a first vertical axis and a first lateral axis, said main frame having a frame arm extending therefrom, and wherein said main frame supports the wind turbine blade a distance away from the mounting flange;

a root stand supported from said frame arm;

a mounting flange adapter supported from said root stand by a flange pivot, which pivots about a second lateral axis and a longitudinal axis, said mounting flange adapter configured for fixed attachment to the mounting flange, and wherein said mounting flange further includes a hub having plural radially oriented spokes extending therefrom, each having a flange attachment member at a distal end thereof for fixedly engaging the mounting flange of the wind turbine blade, and having a spindle extending from said hub about said longitudinal axis;

a counterweight disposed upon said main frame, and having a mass selected to balance the combined mass of said main frame, said frame arm, said root stand, and said mounting flange adapter at a balance point adjacent to said first lateral axis, and wherein rotational orientation of the wind turbine blade about the longitudinal axis is selectable according to the angular position between said mounting flange adaptor and said root stand, and wherein the wind turbine blade longitudinal position with respect to the railcar is located by said root stand.

15. The support fixture of claim 14, and further comprising:

a blade cradle disposed between said main frame and the wind turbine blade, and having a conformal inset disposed upon said blade cradle, having a support surface conformed to a profile of the wind turbine blade at a position of support.

16. The support fixture of claim 14, further comprising:

a stand pivot assembly disposed between said frame arm and said root stand, which pivots about a second vertical axis.

17. The fixture of claim 14, and wherein said flange pivot assembly further comprises:

a bearing mounting plate coupled to said root stand about said second lateral axis, and a spindle cradle bearing fixed to said bearing mounting plate for pivotally supporting said spindle about said longitudinal axis.

18. The fixture of claim 17, and further comprising:

an alignment plate disposed between said hub and said bearing mounting plate, having plural alignment holes for receiving at least a first bolt for fixedly aligning said angular position between said mounting flange adapter and said root stand.

\* \* \* \* \*